United States Patent
Lal et al.

(10) Patent No.: US 7,810,713 B2
(45) Date of Patent: Oct. 12, 2010

(54) CASH FLOW PROJECTION TOOL

(75) Inventors: Arun Lal, Kirkland, WA (US); Peter Birkedal Hansen, Seattle, WA (US); Sumeet U. Shrivastava, Kirkland, WA (US); Christopher Hargarten, Seattle, WA (US); Dan Iatco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1470 days.

(21) Appl. No.: 10/927,288

(22) Filed: Aug. 26, 2004

(65) Prior Publication Data

US 2006/0047588 A1   Mar. 2, 2006

(51) Int. Cl.
*G06Q 40/00* (2006.01)
(52) U.S. Cl. .................. 235/377; 235/379; 705/30; 705/36 R
(58) Field of Classification Search .............. 705/1, 705/28, 30, 35, 36 R; 235/376, 377, 379, 235/385
See application file for complete search history.

(56) References Cited

U.S. PATENT DOCUMENTS

| | | | | |
|---|---|---|---|---|
| 5,126,936 | A * | 6/1992 | Champion et al. | 705/36 R |
| 5,615,109 | A * | 3/1997 | Eder | 705/8 |
| 6,065,675 | A * | 5/2000 | Teicher | 235/380 |
| 6,115,690 | A * | 9/2000 | Wong | 705/7 |
| 6,343,275 | B1 * | 1/2002 | Wong | 705/26 |
| 6,484,152 | B1 * | 11/2002 | Robinson | 705/36 R |
| 6,581,045 | B1 * | 6/2003 | Watson | 705/400 |
| 6,609,101 | B1 * | 8/2003 | Landvater | 705/10 |
| 6,768,995 | B2 * | 7/2004 | Thier et al. | 707/100 |
| 6,916,276 | B1 * | 7/2005 | Robinson | 482/51 |
| 7,111,007 | B2 * | 9/2006 | Thier et al. | 707/100 |
| 7,177,834 | B1 * | 2/2007 | Maestle | 705/38 |
| 7,305,351 | B1 * | 12/2007 | Bechhofer et al. | 705/7 |
| 7,376,610 | B2 * | 5/2008 | Schneider | 705/36 R |
| 7,580,848 | B2 * | 8/2009 | Eder | 705/7 |

(Continued)

OTHER PUBLICATIONS

"Powerful Forecasting. Better Budgeting." PaloAlto Software, http://www.paloalto.com/commn/products/index.cfm?manager=csh&affiliate=abusinessr. Printed Jul. 6, 2004.

(Continued)

*Primary Examiner*—Andrew Joseph Rudy
(74) *Attorney, Agent, or Firm*—Marshall, Gerstein & Borun LLP (57) ABSTRACT

A method of projecting cash flow is disclosed which may include the steps of displaying a position date at which a cash flow position is to be calculated, displaying a beginning cash balance total amount as of the position date, displaying a forecast sales total amount as of the position date, displaying an accounts receivable total amount as of the position date, displaying an accounts payable total amount as of the position date, displaying a projected expense total amount as of the position date and displaying a resulting cash flow position as of the position date. The method may allow the user to edit the amount of at least one of the displayed beginning cash total balance, forecast sales total amount, account receivable total amount, accounts payable total amount and projected expense total amount along with the position date and the method may calculate and display a new cash flow position based on at least one of the edited amounts and edited position date.

20 Claims, 9 Drawing Sheets

U.S. PATENT DOCUMENTS

2002/0046143 A1 4/2002 Eder
2002/0174006 A1 11/2002 Rugge et al.
2003/0187762 A1 10/2003 Coyle

OTHER PUBLICATIONS

"Cash Flow and Collections Management," Microsoft Business Solutions—Great Plains, http://www.microsoft.com/businesssolutions/financials/great%20plains/modules/gp_cashflowcollections.mspx. Posted Apr. 22, 2003.

"Cash Flow and Collections Management," Microsoft Business Solutions, Financial Mangement—Great Plains, www.microsoft.com/BusinessSolutions. Copyright 2003.

"Cash Management," BusinessWorks Gold, Best Software, Inc. Copyright 2003.

* cited by examiner

CASH FLOW PROJECTION TOOL

BACKGROUND

Computer systems are well adapted for accounting operations. The traditional method of posting entries by writing in a paper ledger to track the performance of a business has been greatly simplified by creating graphical input screens that take the inputted information and automatically post the proper accounting entries in the proper accounts. Similarly, cash flow projections were previously prepared on paper, requiring duplicative entries from accounting ledger entries. Modern spreadsheets have made cash flow projections easier but still require duplicative entries of data.

SUMMARY

According to one aspect of the disclosure, a method of projecting cash flow may have the steps of displaying a position date at which a cash flow position is to be calculated, displaying a beginning cash balance total amount as of the position date, displaying a forecast sales total amount as of the position date, displaying an accounts receivable total amount as of the position date, displaying an accounts payable total amount as of the position date, displaying a projected expense total amount as of the position date and displaying a resulting cash flow position as of the position date. The method may allow a user to edit the amount of at least one of the displayed beginning cash total balance, forecast sales total amount, account receivable total amount, accounts payable total amount and projected expense total amount along with the position date. The method may calculate and display a new cash flow position based on at least one of the edited amounts and edited position date.

According to another aspect of the invention, the method may automatically retrieve at least one of the beginning cash balance amount, the forecast sales amount, the accounts receivable amount, the accounts payable amount and the projected expense amount and related dates from related software modules. Further, the method may allow the editing of amounts and dates but does not change the retrieved amounts and dates.

According to another aspect of the invention, a user may select to see additional detail regarding the beginning cash flow total balance, the forecast sales total amount, the accounts receivable total amount, the accounts payable total amount and the projected expense total amount. The additional detail may be an amount, a description and a date. The cash balance total amount may be the total of the cash balances of distinct cash accounts, the forecast sales total amount may be the total of the amount of the individual sales forecasts, the accounts receivable total amount may be the total of the amount of the individual accounts receivables, the accounts payable total amount may be the total of the amount of the individual accounts payables and the projected expenses total amount may be the total of the amount of the individual projected expenses. The additional detail regarding the beginning cash balance amount, the forecast sales amount, the accounts receivable amount, the accounts payable amount and the projected expense amount may be automatically retrieved from related software modules.

According to another aspect, the user may be able to edit at least one of the amount or the date and calculate and display a new cash flow position based on at least one of the edited amounts and edited position dates. In addition, a user may be allowed to enter a dummy additional detail entry and the method may calculate and display a new cash flow position based on at least one of the dummy amounts and dummy position dates. The dummy entry may be displayed with a different visual indication than the non-dummy entry. The user may be able to select to change the edits of the amounts and dates to be returned to their non-edited values.

According to a further aspect of the invention, a graph may be displayed of projected cash flow over a period of time. The user may be permitted to select a start date of the period of time and select an end date of the period of time. The graph may be automatically updated to reflect the edits and dummy entries. The user may be able to select a drop down box that displays a calendar by which a user can review past and future dates and select a date on the displayed calendar to be the position date or the user can select a date range to be displayed.

According to another aspect, a user may be allowed to select to export the cash flow projection to a spreadsheet where the data on the resulting spreadsheet is sorted by additional detail regarding the beginning cash balance amount, the forecast sales amount, the accounts receivable amount, the accounts payable amount and the projected expense amount.

According to another aspect, the method may be performed as a computer program wherein memory portions are physically configured in accordance with computer program instructions that would cause the computing apparatus to perform the steps of the method.

DETAILED DESCRIPTION OF VARIOUS EMBODIMENTS

A computer system may be programmed to provide accounting services. In addition, the computer system may be programmed to use accounting data to create a cash flow projection. The accounting data may be easily modified without creating separate accounting entries to create additional cash flow projections without changing the underlying accounting data. Additional detail on the accounting data that creates the cash flow projection may be obtained by selecting a category of accounting data and the cash flow projection may be displayed in a graphical fashion.

Figure 1:
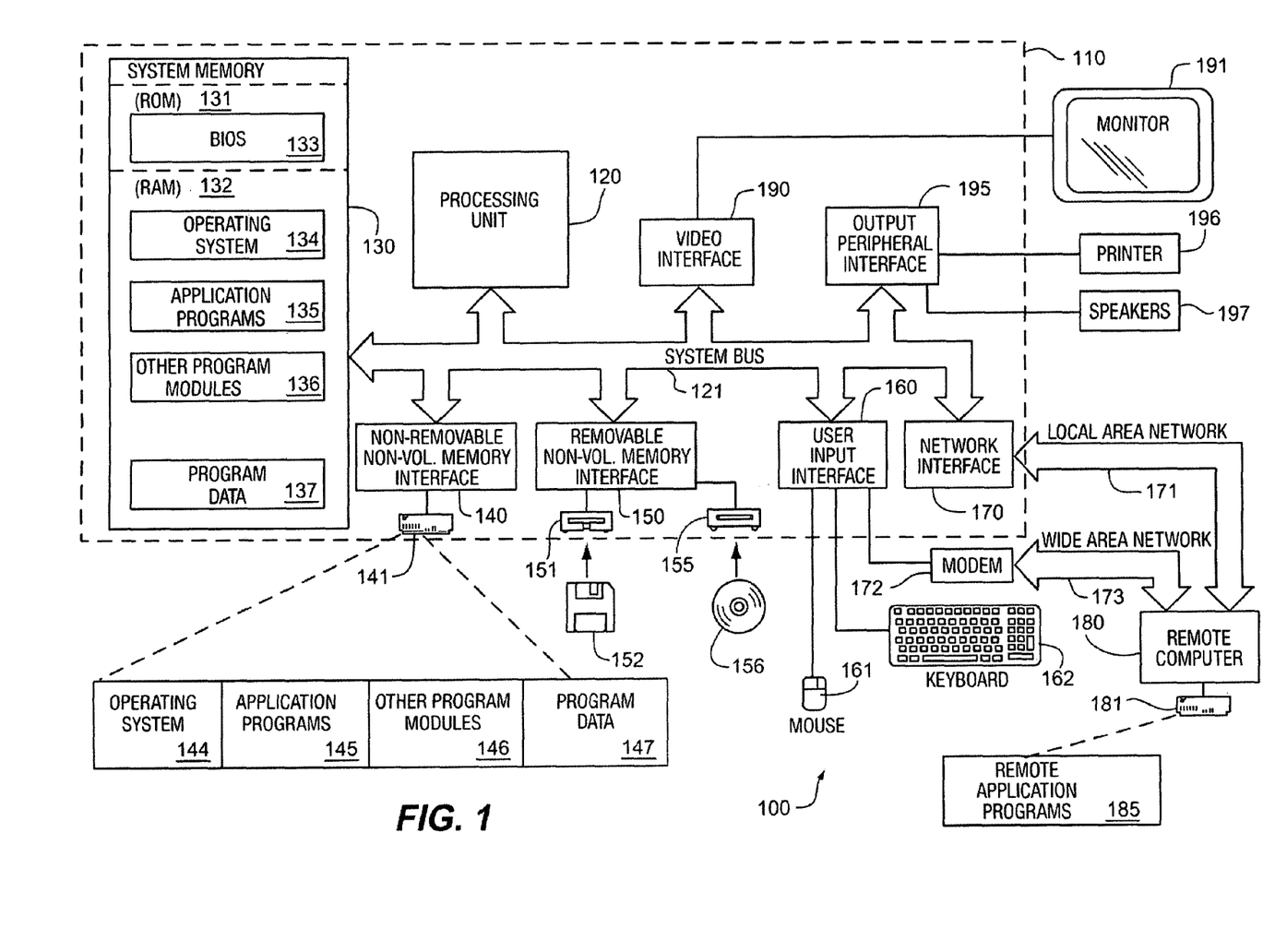
FIG. 1 is a block diagram of the electronic components of a computing system that may be used with the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Accounting and Cash Flow

In general, accounting is a system of recording, reporting, analyzing, verifying, and summarizing business and financial transactions for a business. In the past, transactions were kept in paper ledgers. The details of double entry accounting and accrual accounting have been long established and can be viewed at www.fasb.org (the Financial Accounting Standards Board web site). The purpose of accounting is to give business owners and the public a reliable and standard measure of the financial performance of a company.

Cash flow statements provide additional information to business owners. In business, items that are purchased are often purchased on credit or paid for at a time in the future. These purchases are referred to as accounts payable. On an accrual basis, the purchase may be reflected immediately as a debt on the corporation's accounting system. However, while a purchase may be made on the first of the month, the actual money needed to pay for the purchase may not be needed until a check is written, sent and submitted to the business' bank where it may clear around the $25^{th}$ of the month, for example. Accordingly, from a cash flow perspective, there will not be a withdrawal from the business bank account until the check "clears" which may be around the $25^{th}$ of the month of purchase. In summary, a purchase may be indicated as a debt in a corporation's accounting system on the date of purchase but the cash needed to pay for the purchase may not be needed for several weeks into the future.

Related, items that are sold may not result in cash immediately being paid to the business. Items that are sold are often sold on credit and the actual money may be received in the future. On an accrual basis, the sale may be reflected immediately as an asset (an account receivable) on the corporation's accounting system. However, while a sale may be made on the first of the month, the actual money resulting from the sale may not be received until a check from the purchaser is received and submitted to the business' bank where it may clear around the $25^{th}$ of the month, for example. Accordingly, from a cash flow perspective, there will not be a deposit in the business' bank account until the check clears which may be around the $25^{th}$ of the month of sale. In summary, a sale may be indicated as an asset in a corporation's accounting system on the date of sale but the cash from the sale may not be received for several weeks into the future.

Also affecting actual cash flow is the beginning amount of cash that the corporation may have. Usually, corporations have multiple bank accounts and the total of these accounts makes up a beginning cash balance position. Cash flow may be difficult to manage because the flow of cash into and out of a business is not consistent. For example, a corporation may write a check to a vendor on the $1^{st}$ of a month and mail the check on the $5^{th}$ of the month. The vendor may not receive the check until the $10^{th}$ of the month and may wait until the $20^{th}$ to submit the check to the vendor's bank. The check will then have to be processed through the banking system and the money may not be withdrawn from the corporation's bank account until the $25^{th}$ of the month. In review, in this example, the corporation wrote a check on the $1^{st}$ but really had little control over when the cash was actually withdrawn from its bank account and by merely looking at the stated bank account balance, the corporation may overdraw an account by ignoring the outstanding checks. In addition, a business may write hundreds of checks in a month, significantly compounding cash flow problems. Similar problems exist in receiving payment for services.

To better assist a business in determining a cash flow position at a point of time in the future, business attempt to project sales. These projections can be based on sales quotes that a business has created and sent to prospective customers. In the alternative, the projections may be based on other relevant information such as historical patterns or based on data entered by the business.

In addition, expenses can be projected. These projections can be based on responses to requests for proposals that the business has sent out to its suppliers previously. In the alternative, the projections can be based on historical patterns or by data entered by the business.

By adding the beginning cash balance, the sales forecast, the receivables and subtracting the payables and the expense forecast, a projection of the cash flow for a date or a plurality of dates in the future can be created.

Figure 2:
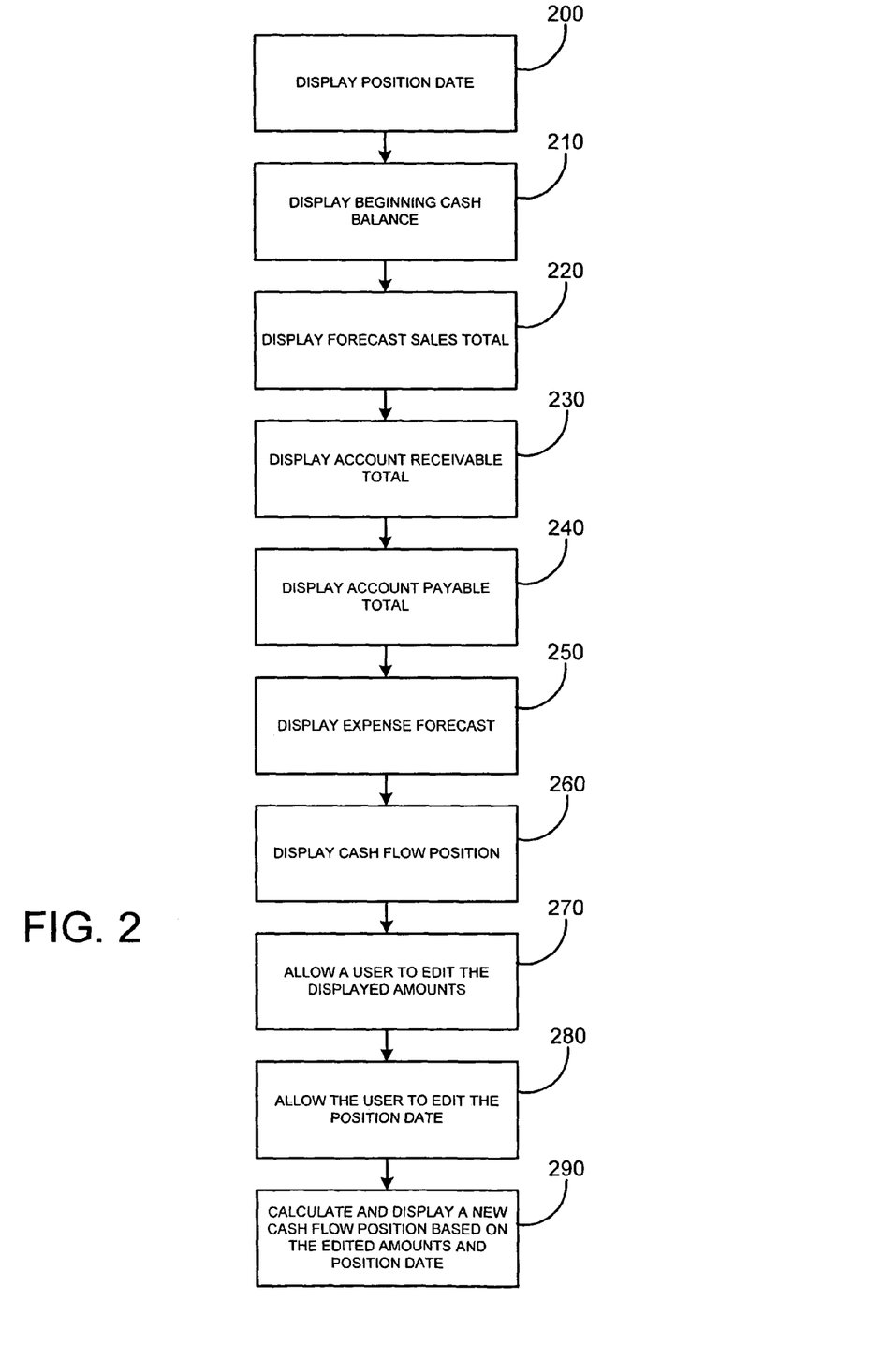
FIG. 2 is a flowchart of an embodiment of a routine that may be performed during operation of the invention.

FIG. 2 illustrates one method of displaying cash flow information. At block 200, a position date is displayed. The position date may be the date which the user desires to know the projected cash flow position. In addition, the date may be a date range, such as the project cash flow over the next week, the next month, the next year or the projected cash flow in between a start date and an end date. For example, a check for $200.00 may be expected to "clear" or be withdrawn from a bank account on the $25^{th}$ of June. If a user requests a cash flow position as of the $24^{th}$ of June, the check for $200.00 will not be indicated as having been withdrawn. However, if a user uses a projected date of June 26, the check for $200 may be indicated as having been withdrawn from the account.

At block 210, a beginning cash balance may be displayed for the selected position date or the range of dates. The beginning cash balance may be from a single account or a total of the balance of the businesses various bank accounts as of the position date or during a range of dates. The balances may be automatically retrieved from different accounting modules or directly from banking institutions.

At block 220, a beginning forecast sales total may be displayed for the selected position date or the range of dates. The forecast sales total may be an estimate by the business owner or may be a combination of various quotes issued by the business to perform work or make products in the future. For example, a business selling widgets may have requested to respond to a request for proposal to sell 800 widgets and the sale of 800 widgets on July 15 may be indicates as sales forecast. The individual sales forecasts that are used to create the sales total may be automatically retrieved from different accounting modules.

At block 230, a beginning account receivable total may be displayed for the selected position date or range of dates. The account receivable total may be a total of all the individual account receivables already entered into the system and are expected to be received as of the position date. The individual receivables that are used to create the receivable total may be automatically retrieved from different accounting modules.

At block 240, an accounts payable balance may be displayed for the selected position date or range of dates. The beginning accounts payable total may be a total of individual accounts payable already entered into the system and expected to be paid by the position date. The individual payables that are used to create the payable total may be automatically retrieved from different accounting modules.

At block 250, a beginning expense forecast total may be displayed for the selected position date or range of dates. The expense forecast may be a single total entered by the business or it may be a total of responses from vendors to requests for proposal issued by the business for expenses the business expects to pay by the position date. The individual expenses that are used to create the expense total may be automatically retrieved from different accounting modules.

At block 260, a total cash flow position for the selected position date or range of dates may be displayed. The displayed cash flow position may be for a selected date or range of dates, the beginning cash balance on that specific date, plus the forecast sales on that date, plus the account receivables for that date minus the accounts payables for that date less the expense forecast for that date.

A block 270 may allow a user to edit the displayed amounts. Specifically the beginning cash balance amount, the forecast sales total amount, the accounts receivable total amount, the accounts payable total amount, or the expense forecast total amount. Even though these values may be changed on the display, the actual data used to create these amounts will not be changed. For example, if a user changes the accounts payable total from $72,000 to $63,000, the individual actual payables summed to arrive at a total of $72,000 will not be edited.

At block 280, the user may be allowed to edit the position date or range of dates. As explained previously, payments may not be withdrawn from a business' bank account until a date in the future and cash may not be received until a date in the future. By changing the position date, the effect of these future transactions may be seen.

At block 290, the system may calculate and display a new cash flow position based on the edited amounts from block 270 and the edited position date from block 280. In addition to being able to change the total amounts displayed on the screen, a user may be able to select a particular total and view additional detail on that particular total. In addition, the underlying detail for the totals may be edited by the user.

Figure 3:
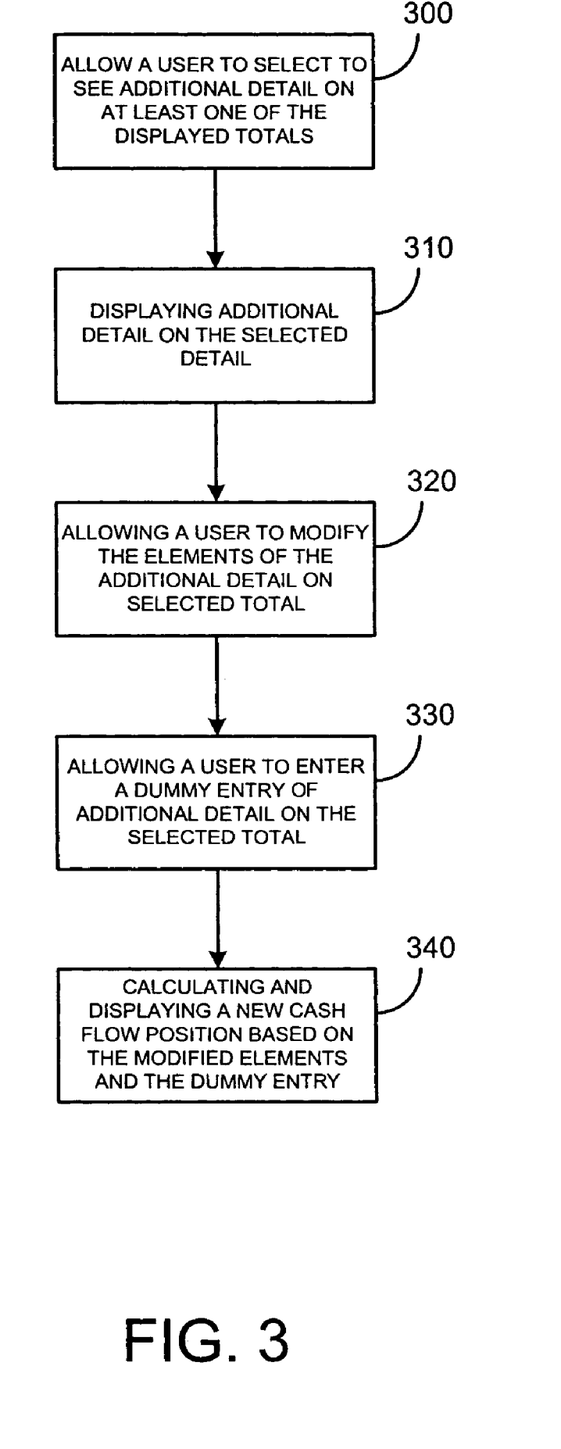
FIG. 3 is a flowchart of an embodiment of a routine that may be performed during operation of the invention.

FIG. 3 illustrates a method for allowing a user to modify the underlying individual data used to create the various totals (beginning cash balance total, the forecast sales total, the accounts receivable total, the accounts payable total, or the expense forecast total) to see the affect on cash flow. While the display of the individual data may be modified for cash flow projection purposes, the actual data retrieved from related accounting modules may not be modified.

At block 300, a user may be allowed to select to see additional detail on at least one of the display totals, wherein the display totals may be the beginning cash balance, cash sales total, accounts receivable total, accounts payable total and the expense forecast total.

At block 310, additional detail on the selected total may be displayed. In an ongoing business, such detail will be readily available from the accounting system. For example, a business will normally have multiple bills to pay going into the future. By selecting to see additional detail regarding accounts payable, the detail regarding these bills in the future will be displayed. In another example, the data is drawn from another, unrelated accounting system where the accounting system may not even be in the same location.

At block 320, a user may be allowed to modify the elements of the additional detail on the selected total. For example, if accounts payable is selected, additional accounts payable detail may be displayed on the display. One such example would be a phone bill to be paid in the future. A user may wish to see what effect changing phone companies might have on cash flow. The user may be permitted to modify the amount on the phone bill detail and view the effect on cash flow.

At block 330, the user may be allowed to enter a dummy entry of additional detail on the selected total. For example, if additional detail on accounts payable is selected to be displayed, a user may have a dummy entry into the accounts payable system. For example, a user may wish to see what affect purchasing a new cell phone would have on cash flow. The system will allow the user to enter a dummy entry for a cell phone into the system to view the change on cash flow. This will not be reflected as an actual bill in the accounts payable system, but will merely be used for projecting cash flow.

Figure 4:
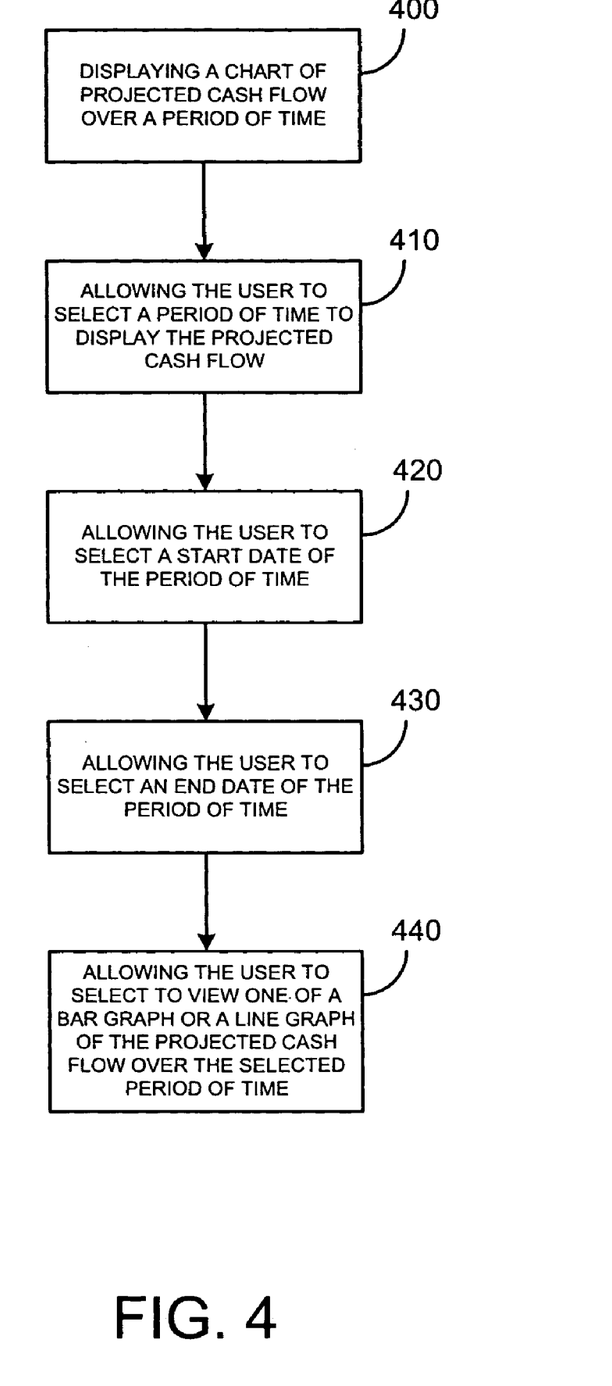
FIG. 4 is a flowchart of an embodiment of a routine that may be performed during operation of the invention.

At block 340, a new cash flow position will be calculated and displayed based on the modified elements in the dummy entries. In addition to viewing a total cash flow dollar amount for a date or a selected range of dates, the cash flow may be displayed as a graph of projected cash flow over a period of time. FIG. 4 illustrates one such method of graphically displaying cash flow over time.

At block 400, a graph of projected cash flow over a period of time may be displayed. The graph may be based on the information already in the system.

At block 410, the user may be allowed to select a period of time to display the projected cash flow. The period of time may be a week, a month, a year, or a number of years. The user may be able to select this period by clicking on a drop-down box on the display and selecting a specific period of time or by typing in a period of time in the input box.

At block 420, the user may be permitted to select a start date of the period of time for the projected cash flow. For example, a business owner may wish to see a projection of cash flow from the $15^{th}$ of one month to the $15^{th}$ of another month. The user may be able to type in the specific start date or the user may be able to select a specific date from a drop-down box on the display which has a calendar which the user can manipulate into the past and into the future and can select the date by merely clicking on the date on the displayed calendar.

At block 430, the user may be permitted to select an end date of the period of time for which a projection cash flow is desired to be viewed. Following the example from block 420, the end date would be the $15^{th}$ of the following month. Again, the date may be typed in or may be selected from a drop-down box displaying a calendar which can be manipulated into the past and into the future and the user can select the date by merely clicking on the date on the displayed calendar.

At block 440, the user may select to view one of a bar graph or a line graph of the projected cash flow over the period of time selected. A bar graph will display bars at even time intervals over the selected period of time, where a line graph will show the projected trend over the selected period of time with data points selected evenly over the period of time.

Figure 5:
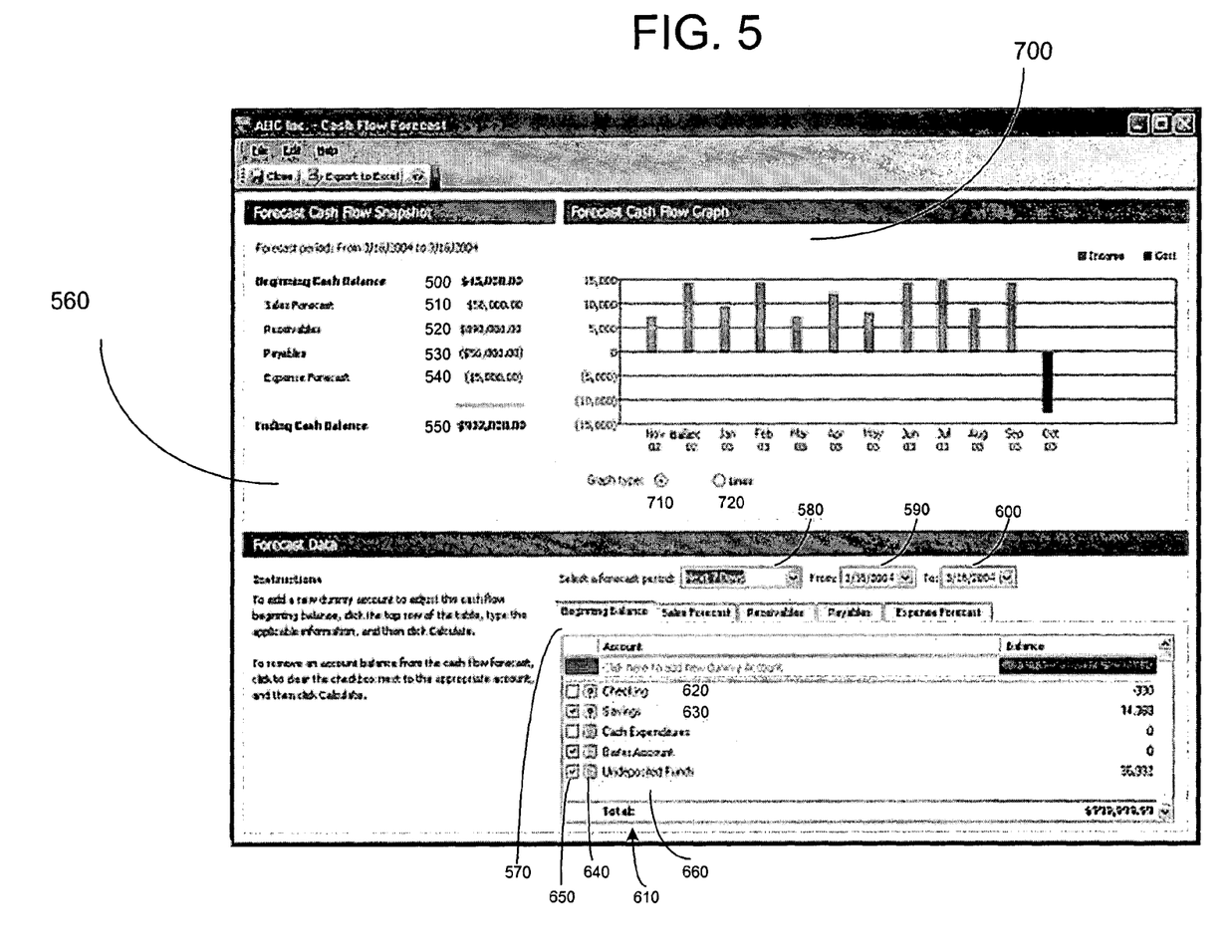
FIG. 5 is an illustration of a screen that may be displayed when a user selects to view a cash flow forecast with beginning balance detail.

FIG. 5 illustrates an example display screen of the cash flow projection tool. A beginning cash balance 500 is displayed in a section of the display. A sales forecast total 510 may be displayed underneath any cash balance. A receivables total 520 may be displayed under the sales forecast total 510. The payables total 530 may be displayed under the receivables total 520. Expense forecast 540 may be displayed under the payables total 530 and an ending cash balance 550 may be displayed under the expense forecast 540. A forecast period 560 is displayed at the top of the box. In this particular example, the display indicates that the forecast period is from Mar. 16, 2004 to Mar. 16, 2004, meaning this is a cash flow projection for the actual date Mar. 16, 2004. As described previously, this can be a range of dates or a single particular date. Also as described previously, any of these elements could be modified by the user by simply clicking on them and editing the amount. However, by changing these amounts on the forecast screen, the underlying data which created these amounts will not be changed. On the bottom part of the screen, tabs may be displayed, which a user can select to find out additional detail regarding any of the cash flow totals, specifically, the beginning balance, the sales forecast, the receivable total, the payable total, or the expense forecast total.

In FIG. 5, a beginning balance tab 570 has been selected by the user. As can be seen, the user may be presented with options to select a forecast. One option is a drop-down box 580 which allows a user to select to see a cash flow over a standard period of time such as, for example, the next seven days, the next fourteen days, the next month, or the next year. In addition, a user could select to use a from/to basis for the period of cash flow. The from date 590 can be selected by either typing in the actual from date or by using a drop-down calendar through which a user can navigate and select a specific from date. Similarly, a to date 600 can be selected by typing in the to date or by using a drop-down box and selecting a date on a calendar displayed on the screen. As the beginning balance tab 570 has been selected, additional detail regarding the beginning balance is displayed 610. The specific elements that make up the beginning balance total are displayed. In this example, a checking account balance 620 shows a negative balance of $330 while the savings account 630 indicates a positive balance of $14,368. If the user desires, these totals can be changed for the purpose of the cash flow tool. For example, the user could change the total of the savings account 630 to be changed from $14,368 to $54,368 by merely selecting the total $14,368 and typing in a new total.

In addition, the display may indicate whether accounts have been modified. For example, a box may be displayed next to the description of the account and if the account is modified, the display may change from a traditional looking box to a box with a question mark 640. In addition, the user may be presented the option to have certain accounts included in the beginning balance and other accounts not include in the beginning balance. For example, there may be a box which a user can check to have the accounts included in the beginning balance total. One such box is indicated as element 650.

Furthermore, a user can create a dummy account in the beginning balance. For example, on open line 660, the user can type in a name of a fictitious account and an amount in that account to project what the cash flow would be if such account did exist. On the display next to the description of the account, it may be indicated that such an account is a dummy account by having a display that is distinct from the other display boxes (640). A graph of the forecast of cash flow may be displayed 700. The user may be permitted to view the graph as a bar-type graph 710 or the user may select to see a line-type graph 720 by clicking on either the bar-type graph option or the line graph option. Other graphs may be available.

Figure 6:
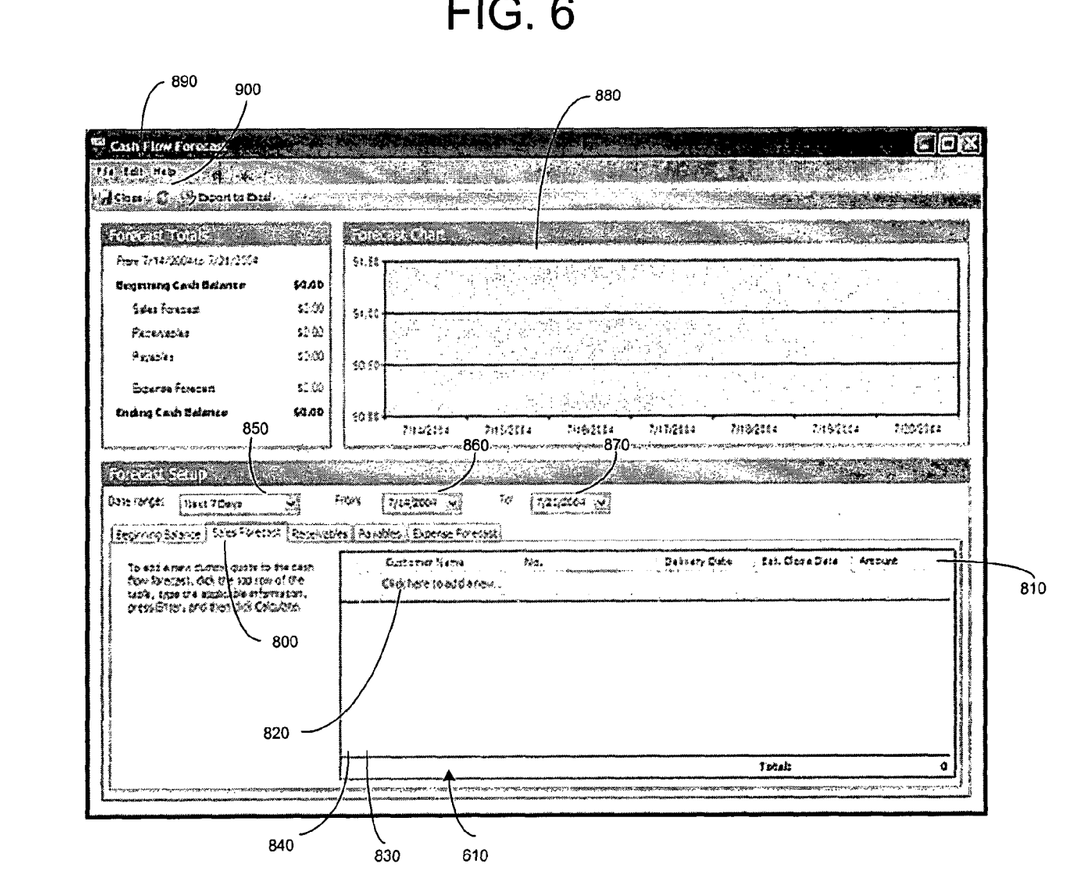
FIG. 6 is an illustration of a screen that may be displayed when a user selects to view a cash flow forecast with sales forecast detail.

FIG. 6 is an illustration of a sample screen that may be displayed if a user clicks on the sales forecast detail tab 800. In the resulting display 610, further detail regarding the sales forecast may be displayed, for example, a customer name, quote number, delivery date, estimated close date and amount may be displayed in a title row 810. Displayed information can be displayed in virtually any desired order. For example, displayed data can be sorted by customer name, by selecting the customer name tag, or the data can be sorted by delivery date by selecting the delivery date tab. The data in the detailed data display can be modified by the user by selecting and typing over it for forecasting purposes, however, the underlying data imported from the accounting system may not be changed.

On the display 610, the user can edit any of the information displayed, such as the customer name, delivery date, estimated close date, or the amount, however, the underlying imported accounting data will not be changed. In addition, on an open line 820, the user can add a dummy sales forecast to see what would happen if a particular sales forecast did occur. The dummy entry will be indicated by being displayed in a different manner on the display, for example, in the column 830, it may be indicated that a certain entry is a dummy entry. In addition, users may choose to select to use certain sales forecasts in the cash flow projection, selectable boxes 840 may be displayed next to the customer name if the user selects the box, the data will be used in the cash flow projection and if the user does not select the box, the information will not be used in the cash flow projection.

In addition, the date range of the forecast can be edited, for example via a drop down box 850 or the user may simply choose to type in a date range. The user may also be permitted to use to and from dates to determine the date range to display the forecast. For example, the user could type in a certain date in the from entry field 860. The user may select to have a drop down box open in which a calendar will be displayed in which the user can view and select a chosen from date. Similarly, a to date may be chosen by typing in a date in the to entry box, 870, or by selecting a drop down action which may display a calendar of dates from which the user can sort and select a chosen to date. A date range may then be used to create a forecast graph 880 which will display the sales forecast over a chosen date range. In addition, by selecting the edit tab 890 the user may be presented the action to clear all the edited entries made or clear all the dummy entries made such that the data display will be the original data displayed in the cash flow forecast tool. The user may also select to refresh the display by selecting the refresh button 900. The refresh will recalculate the worksheet to reflect any changes made.

Figure 7:
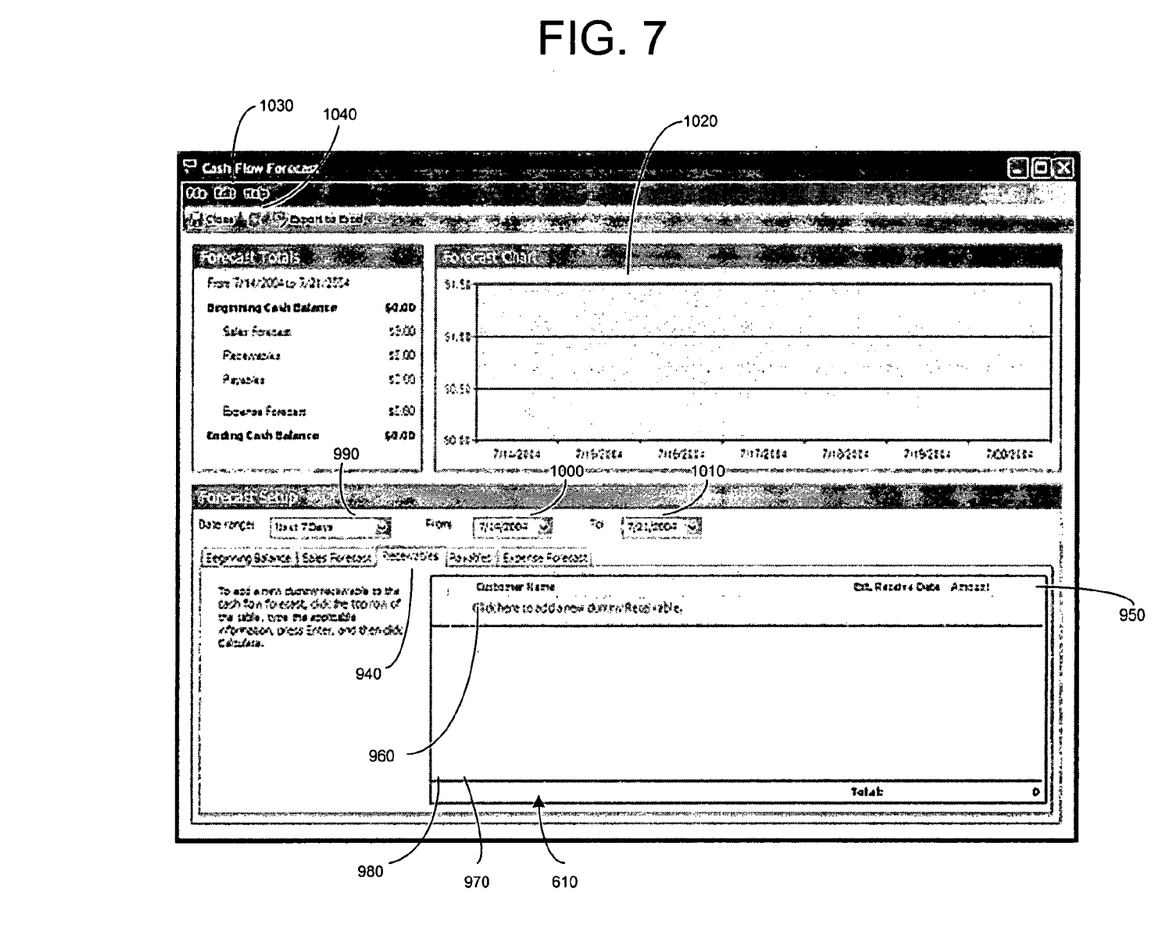
FIG. 7 is an illustration of a screen that may be displayed when a user selects to view a cash flow forecast with accounts receivable detail.

FIG. 7 is an illustration of a screen that may be displayed if a user selects the Receivables tab 940. Detailed information regarding accounts receivable may be displayed in the display space 610, for example, a customer name, an estimated receive date, payment and the amount of the payment. Detailed information can be sorted in a variety of ways, by any of the title fields 950, such as customer name, estimated receive date or amount by merely clicking on the title tab desired such as clicking on the amount tab will sort the detailed data by the amount. Any displayed data may be modified by the user, by simply selecting and typing over the display data. In addition, dummy entries may be added to the detailed display in an empty line 960.

Modified entries or dummy entries may be indicated by being displayed in a different manner or by having a different icon displayed next to them in a column 970. In addition, the user may be presented the option to include certain items as receivables in the cash flow projection and to exclude others. As an example, as selectable box 980 may be displayed next to each detailed entry if a user decides to have a certain detailed data element included in the cash flow projection, the user may select the box 980 and items which are not selected will not be included in the cash flow projection. The user may select to see receivable detailed items for a desired period of time. For example, the user may select via a date range box 990 to see the next seven days' worth of receivables by selecting next seven days in the drop down box or merely typing the desired number of days into the future. In addition, the user may select to see items between a from date and a to date. For example, in a from input box 1000 the user may type in a date or select a date from a displayed calendar in a drop down box. Similarly, the user may select a to date 1010 by typing in a date in the to input box or selecting a date from the calendar display in the to drop down box. The date range desired by the user may be used to create a forecast display 1020. In addition, the user, by selecting the edit tab 1030 may be able to clear all the edited or dummy items by selecting that option under the edit tab. User also may select the recalculate tab 1040 to have the cash flow projection recalculated to reflect changes made.

Figure 8:
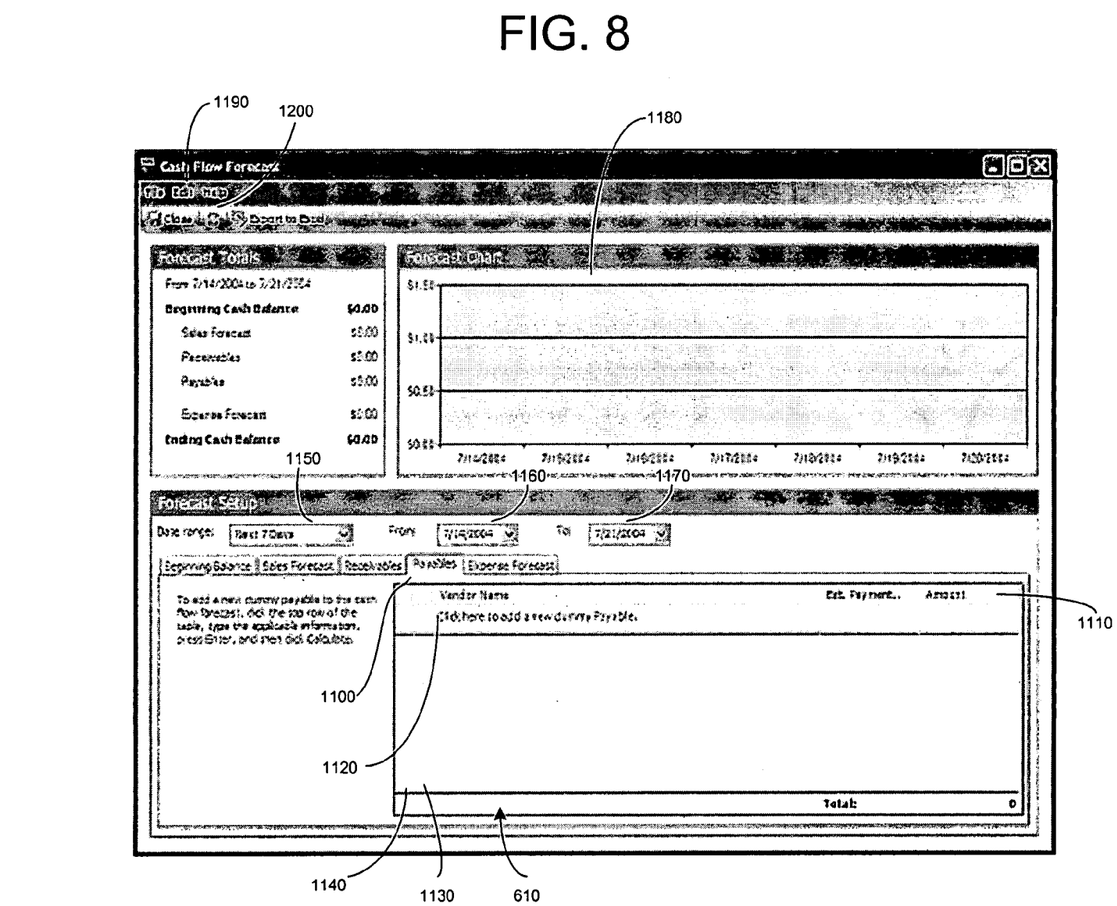
FIG. 8 is an illustration of a screen that may be displayed when a user selects to view a cash flow forecast with accounts payable detail.

FIG. 8 is an illustration of a display that may be created when a user selects the payables tab 1100. In the detailed display space 610 details of accounts payable may be displayed. Payables may be sorted by any of the categories in the title line 1110 such as by vendor name, estimated payment or amount by merely clicking on the category title in the display. In addition any displayed payables may be modified by merely selecting them and typing over them. Further, dummy payables may be added by clicking on an empty line and typing in relevant information. Elements which are dummies or which have been modified may be displayed differently on the display such as being highlighted or having a different symbol in the column next to their vendor name 1130. In addition, a user may be offered the option to include certain payables and not other payables in the cash flow projection. For example a selectable box may be displayed 1140 next to the vendor name and if the user desires to have that payable included in the cash flow projection, the user would select the selectable box, if the user did not desire to have that payable included in the cash flow projection, the box would not be selected.

The payables can be reviewed for a variety of time periods, for example, the user may type in a desired date range in the data date range input box 1150 where the user can select a date range by selecting a date range in the drop down box. In addition, the user may desire to have the review of payables from a date to a certain date, the user may do this by typing in a date in the from input box 1160 or by selecting a date in a drop down calendar in the from input box. In addition, the user may select the to date by typing in the date in the to input box 1170 or by selecting a date on the calendar displayed in the drop down box. A forecast graph of the payables for the selected date range may be displayed in the forecast graph display 1180. A user may clear edited or dummy entries by selecting the edit tab 1190 and selecting clear edited entries. In addition a user may select the recalculate button 1200 which will recalculate the cash flow projections based on changes made to the payables detail.

Figure 9:
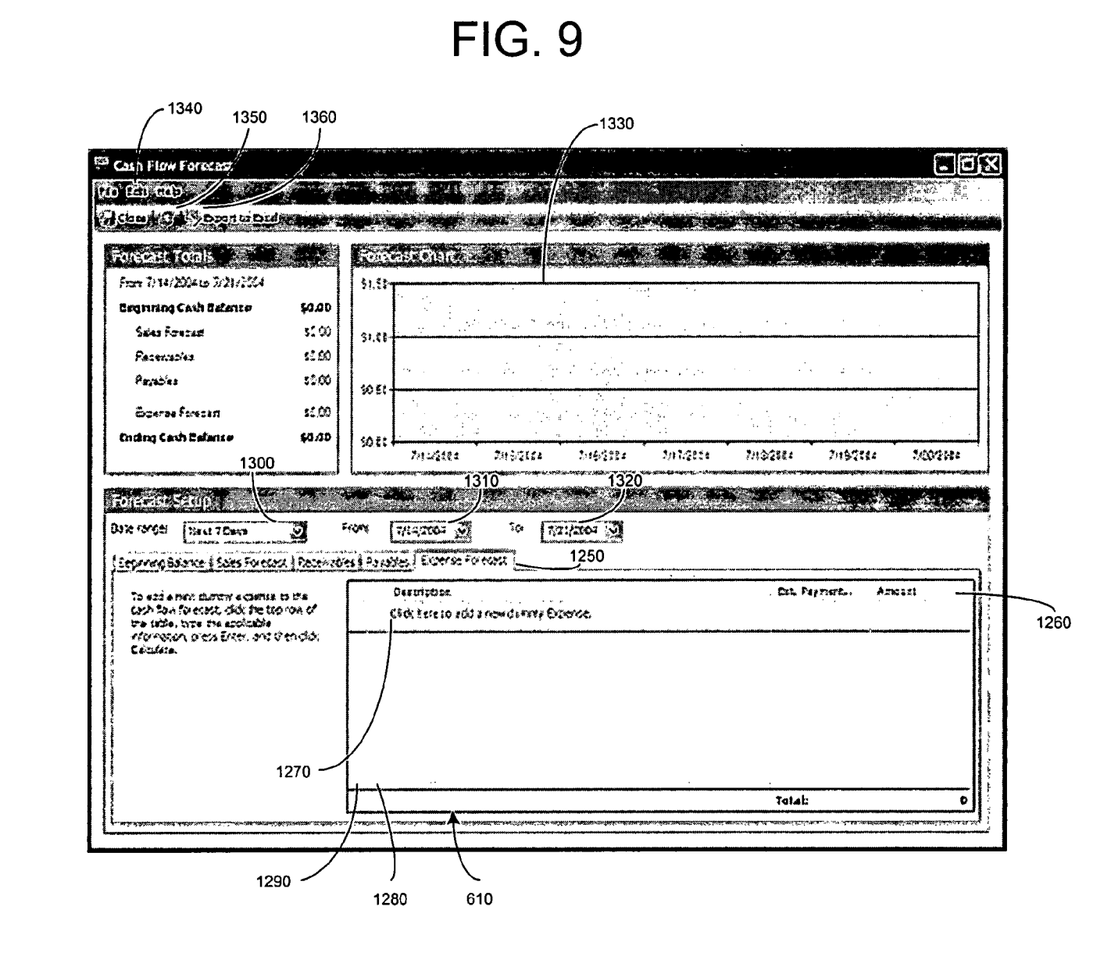
FIG. 9 is an illustration of a screen that may be displayed when a user selects to view a cash flow forecast with expense forecast detail.

FIG. 9 is an illustration of a display that may be shown if the period of expense forecast tab 1250 is selected by a user. Details of expense forecast may be displayed in a expense forecast display space 610. The expense forecast may be sorted by any of the titles or the columns 1260 such as the description, the estimated payment or the amount. The other detailed data may be edited by the user by merely selecting and typing over the displayed data. In addition, dummy entries 1270 may be added by selecting an empty line and typing in relevant data. The fact that data has been edited or an entry is a dummy expense may be indicated by displaying these entries differently in the display space 610. In one example, in a column next to the description of the expense forecast 1280 a symbol may indicate that an entry has been edited or that it is a dummy entry. In addition, a user may select to have certain items included in the cash flow projection, for example, in a column next to the description of the detailed expense forecast 1290, selectable boxes may be displayed. If the user desires to have a certain display forecast included in the cash flow projection the user may select the selectable box and the expense will be included. If the user does not desire to have a certain expense forecast included in the cash flow forecast, it will not be selected by the user. The forecast can be set up for a variety of date ranges. For example the user can select to have the forecast be for a period of time by typing in a desired number of days in the date range input box 1300 or the user may use a drop down box to select a set number of days. In addition the user may desire to have a forecast displayed from a certain date to another known date. The user may do this by typing in a date in the from input box 1310 or by selecting a date in the drop down calendar displayed when the from input box is selected. Similarly, a to date may be selected by typing in a date in the to input box 1320 or by selecting a date in a drop down calendar when the to input box is selected.

A forecast graph 1330 may be displayed over the desired date range. The graph will indicate the expenses for the desired date range. In addition the user may clear all edited or dummy variables by selecting the edit box and selecting to clear all edited items or all dummy variables. In addition, the user may select the recalculate button 1350 which will recalculate the cash flow projection based on the changes made by the user.

In addition, at any time the user may select an Export to Excel button 1360 and export the relevant data to a spreadsheet such as an Excel worksheet. The data may be separated by type in the spreadsheet such as beginning balance information being under the beginning balance heading, the sales forecast being under the sales forecast summary heading, the receivables detail being under the receivables heading, the payables detail being under the payables heading and the expense forecast detail being under the expense forecast heading.

The detailed data to be displayed in the display box 610 may be drawn from related modules of an accounting system. For example, the accounting system will already have detailed information regarding beginning balance in various accounts, sales forecasts, receivables, payables and expense forecasts. The data may be at a remote location or in a completely different accounting system. This data will be imported into the cash flow projection tool. The user will have the option to edit this imported data, but the underlying data will not be changed by modifying it in the cash flow projection tool. In this way, different scenarios can be viewed without changing the underlying data thereby ensuring the reliability of the accounting system. In addition, dummy entries which can be entered into the cash flow projection tool do not have to be entered into the primary accounting system. For example, if a business desired to see the results of receiving a certain receivable 10 days early, they do not have to change the actual data in the accounting system, but could merely change it in the cash flow projection module and see the outcome on cash flow without having to modify the accounts receivable entry.

The invention claimed is:

1. A computer system comprising a processor that executes computer executable instructions for a method of projecting cash flow from sales of goods and services, a memory to store data related to the computer executable instructions and an input/output circuit, the method comprising computer executable instructions for:
    displaying a position date at which a cash flow position based on the sales of good and services is to be calculated;
    displaying a beginning cash balance total based on the sales of goods and services amount as of the position date;
    displaying a forecast sales total amount based on the forecast sales of goods and services as of the position date;
    displaying an accounts receivable total amount based on the sales of goods and services as of the position date;
    displaying an accounts payable total amount based on purchases of goods and services as of the position date;
    displaying a projected expense total amount based on expenses related to the sales of goods and services as of the position date;
    displaying a resulting cash flow position based on revenues and expense based on the sale of goods and services as of the position date;
    allowing a user to edit an amount of at least one of the displayed beginning cash total balance, forecast sales total amount, account receivable total amount, accounts payable total amount and projected expense total amount;
    allowing a user to edit the position date; and
    calculating and displaying a new cash flow position based on the sales of goods and services based on at least one of the edited amounts and edited position date.

2. The method of claim 1, further comprising:
    automatically retrieving at least one of the beginning cash balance amount, the forecast sales amount, the accounts receivable amount, the accounts payable amount and the projected expense amount and related dates from related software modules.

3. The method of claim 2, wherein the editing of amounts and dates does not change the retrieved amounts and dates.

4. The method of claim 1, further comprising;
    allowing a user to select to see additional detail regarding at least one of a group consisting of the beginning cash flow total balance, the forecast sales total amount, the accounts receivable total amount, the accounts payable total amount and the projected expense total amount.

5. The method of claim 4, wherein the additional detail comprises an amount, a description and a date.

6. The method of claim 4, wherein the cash balance total amount comprises the total of the cash balances of distinct cash accounts.

7. The method of claim 4, wherein the forecast sales total amount comprises the total of the amount of the individual sales forecasts.

8. The method of claim 4, wherein the accounts receivable total amount comprises the total of the amount of the individual accounts receivables.

9. The method of claim 4, wherein the accounts payable total amount comprises the total of the amount of the individual accounts payables.

10. The method of claim 4, wherein the projected expenses total amount comprises the total of the amount of the individual projected expenses.

11. The method of claim 4, further comprising:
    automatically retrieving the additional detail regarding the beginning cash balance amount, the forecast sales amount, the accounts receivable amount, the accounts payable amount and the projected expense amount from related software modules.

12. The method of claim 4, further comprising:
    allowing a user to edit at least one of the amount or the date; and
    calculating and displaying a new cash flow position based on at least one of the edited amounts and edited position dates.

13. The method of claim 4, further comprising:
    allowing a user to enter a dummy additional detail entry;
    calculating and displaying a new cash flow position based on at least one of the dummy amounts and dummy position dates.

14. The method of claim 13, further comprising:
    visually displaying the dummy entry with a different visual indication than the non-dummy entry.

15. The method of claim 4, wherein the user can select to change the edits of the amounts and dates to be returned to their non-edited values.

16. The method of claim 1, further comprising:
    displaying a graph of projected cash flow over a period of time.

17. The method of claim 1, further comprising:
    allowing the user to select a start date of the period of time;
    allowing the user to select a end date of the period of time.

18. The method of claim 16, wherein the graph is automatically updated to reflect the edits and dummy entries.

19. The method of claim 1, further comprising:
    allowing a user to select a drop down box that displays a calendar by which a user can review past and future dates and select a date on the displayed calendar to be the position date.

20. The method of claim 1, further comprising allowing a user to select to export the cash flow projection to a spreadsheet where the data on the resulting spreadsheet is sorted by additional detail regarding the beginning cash balance amount, the forecast sales amount, the accounts receivable amount, the accounts payable amount and the projected expense amount.

* * * * *